(12) United States Patent
Aldeborg

(10) Patent No.: US 12,257,974 B2
(45) Date of Patent: Mar. 25, 2025

(54) CHILD SEAT MONITORING SYSTEM FOR A VEHICLE

(71) Applicant: Volvo Car Corporation, Gothenburg (SE)

(72) Inventor: Gert Aldeborg, Gothenburg (SE)

(73) Assignee: Volvo Car Corporation, Gothenburg (SE)

( * ) Notice: Subject to any disclaimer, the term of this patent is extended or adjusted under 35 U.S.C. 154(b) by 47 days.

(21) Appl. No.: 18/316,558

(22) Filed: May 12, 2023

(65) Prior Publication Data
US 2023/0382346 A1 Nov. 30, 2023

(30) Foreign Application Priority Data
May 27, 2022 (EP) ...................................... 22175851

(51) Int. Cl.
*B60R 22/48* (2006.01)
*B60N 2/00* (2006.01)

(52) U.S. Cl.
CPC ............. *B60R 22/48* (2013.01); *B60N 2/002* (2013.01); *B60R 2022/4816* (2013.01); *B60R 2022/4866* (2013.01)

(58) Field of Classification Search
CPC ............ B60R 22/48; B60R 2022/4816; B60R 2022/4866; B60N 2/002
See application file for complete search history.

(56) References Cited

U.S. PATENT DOCUMENTS

| 10,857,971 B1 | 12/2020 | Davis | |
|---|---|---|---|
| 2011/0074566 A1 | 3/2011 | Rao et al. | |
| 2013/0021476 A1* | 1/2013 | Trummer | ................ B60R 22/48 348/148 |
| 2018/0126949 A1* | 5/2018 | Turnwald | ................ B60R 22/48 |
| 2018/0284793 A1* | 10/2018 | Wood | ................... G05D 1/0055 |

FOREIGN PATENT DOCUMENTS

DE  10 2016 122 806 A1  5/2018

OTHER PUBLICATIONS

European Search Report received for EP Application Serial No. 22175851.9 dated Nov. 29, 2022, 6 pages.

* cited by examiner

*Primary Examiner* — Nabil H Syed
*Assistant Examiner* — Cal J Eustaquio
(74) *Attorney, Agent, or Firm* — Amin, Turocy & Watson, LLP

(57) ABSTRACT

Child seat monitoring system for a vehicle (e.g., using a computerized tool) is enabled. For example, a monitoring system for a child seat in a vehicle can comprise: a human machine interface unit, and a control unit, wherein the human machine interface unit comprises a sound system and a display unit, wherein the sound system is configured to capture a lock sound of a seat belt of the child seat, wherein the control unit is configured to identify if the lock sound corresponds to a predetermined safe locking sound of the seat belt, and wherein the control unit is configured to indicate in the display unit that the seat belt of the child seat is locked.

20 Claims, 2 Drawing Sheets

CHILD SEAT MONITORING SYSTEM FOR A VEHICLE

CROSS-REFERENCE TO RELATED APPLICATIONS

This application claims the benefit of and priority to pending EP patent application serial number 22175851.9, filed May 27, 2022, and entitled "CHILD SEAT MONITORING SYSTEM FOR A VEHICLE," the entirety of which is hereby incorporated by reference herein.

TECHNICAL FIELD

The present disclosure relates to vehicle safety and, more particularly, to child seat monitoring.

BACKGROUND

Child car seats are used in the vehicle to increase child safety and reduce consequences in case of a car accident or an oversight of a driver. The child car seats generally comprise a 4 or 5-point harness system configured to safely fasten an occupant child during driving. However, such seat belt system may be accidently disengaged, not firmly secured, or malfunction.

SUMMARY

The problem is at least partially solved or alleviated by the subject matter of the present disclosure. It is noted that the aspects of the disclosure described in the following apply to the monitoring system for a child seat in a vehicle, the vehicle comprising such a monitoring system, the method for monitoring for a child seat in a vehicle, and a computer program element for monitoring a child seat in a vehicle.

Examples described herein enable improved child seat monitoring system for a vehicle, which may increase safety of children in a vehicle. Thus, examples described herein can comprise improved child seat monitoring systems which can detect whether the child seat is correctly mounted or to electronically monitor whether the seat belts is locked. Further, examples herein enable an improved warning system configured to generate a warning signal when the seat belt is not secured.

According to an example, a monitoring system for a child seat in a vehicle can comprise: a human machine interface unit, and a control unit, wherein the human machine interface unit comprises a sound system and a display unit, wherein the sound system is configured to capture a lock sound of a seat belt of the child seat, wherein the control unit is configured to identify if the lock sound corresponds to a predetermined safe locking sound of the seat belt, and wherein the control unit is configured to indicate in the display unit that the seat belt of the child seat is locked.

According to another example, a vehicle can comprise: a child seat arrangeable in the vehicle, a processor, and a memory that stores executable instructions that, when executed by the processor, facilitate performance of operations, comprising: capturing a lock sound of a seat belt of the child seat, identifying if the lock sound corresponds to a predetermined safe locking sound of the seat belt, and indicating, in a display unit, that the seat belt of the child seat is locked.

According to yet another example, a method for monitoring for a child seat in a vehicle can comprise: capturing, by a system comprising a processor, a lock sound of a seat belt of the child seat, identifying, by the system, if the lock sound corresponds to a predetermined safe locking sound of the seat belt, and indicating, by the system, in a display unit, that the seat belt of the child seat is locked.

These and other examples of the present disclosure will become apparent from and elucidated with reference to the embodiments and/or examples described hereinafter.

BRIEF DESCRIPTION OF DRAWINGS

Examples according to the present disclosure will be described in the following with reference to the following drawings.

DETAILED DESCRIPTION

Figure 1:
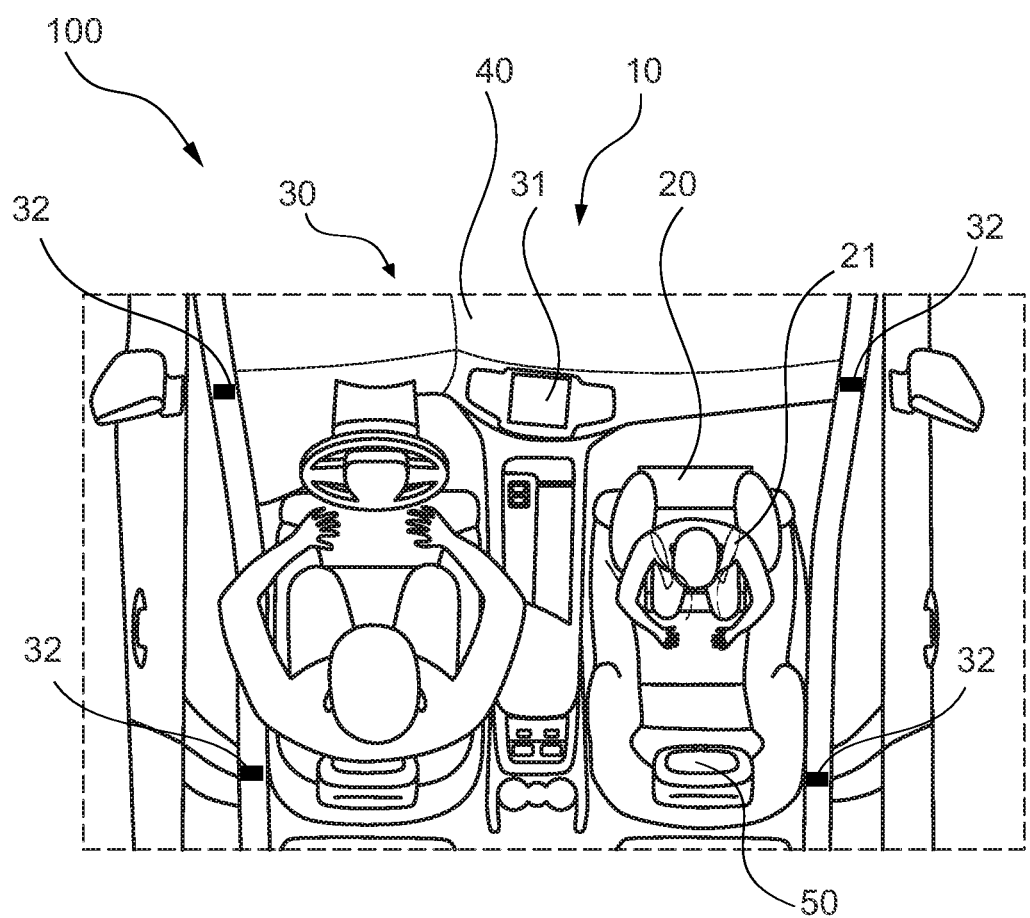
FIG. 1 shows schematically and exemplarily an example of a vehicle comprising a monitoring system for a child seat according to the present disclosure.

According to the present disclosure, a monitoring system for a child seat in a vehicle is presented. The monitoring system comprises a human machine interface unit and a control unit. The human machine interface unit comprises at least a sound system and a display unit. The sound system is configured to capture a lock sound of a seat belt of the child seat. The control unit is configured to identify if the lock sound corresponds to a predetermined safe locking sound of the seat belt, and the control unit is configured to indicate in the display unit that the seat belt of the child seat is locked.

The monitoring system according to the present disclosure may allow a user-specific and/or product-specific monitoring of the seat belt of the child seat. Further, the monitoring system may monitor a current locking and/or unlocking state of the seat belt according to a unique locking and/or unlocking sound of the seat belt. Such information may be transferred to a driver audibly and/or graphically such that the driver may be informed about the locked or unlocked state of the seat belt without continuously watching a child seating in the child seat.

The child seat may be fixedly arranged and releasably attachable on a front passenger seat and/or a rear passenger seat inside the vehicle. In case of the releasable child seat, it may be fixed via a child car seat socket such as an Isofix interface, a top tether interface or the like. In the vehicle, one or more child seats may be mounted to ride one or more children. However, not all of the child seats need to be occupied for performing the child seat monitoring according to the present disclosure.

The human machine interface unit may be configured to interact with the driver and/or user. Accordingly, the human machine interface unit may be able to receive an input from the user and provide an output according to the received input. The human machine interface unit may utilize one or more user-friendly applications to facilitate communication between the user and the control unit of the vehicle. The human machine interface unit may allow the user to enter an input via a (touch) screen, a voice control and/or a gesture control. Further, the display unit may be able to receive user's input by touching and/or via a button, (rotary) knob or the like. The human machine interface unit may also provide information visually and/or audibly. Accordingly, the user may have an easy access to the control unit.

The display unit of the human machine interface unit may be arranged in a driver's visual field. Accordingly, the display unit may be arranged in a front side of the driver. The display unit may be integrated in a Center Stack Display (SCD), Head Up Display (HUD), Drivers Information Module (DIM) and/or Infotainment Head Unit (IHU). The display unit may be configured to show the monitored state of the child seat whether the child seat is occupied, the respective seat belt is locked, where the child seat is positioned etc.

The sound system of the human machine interface unit may comprise one or more sound sensors such as microphones configured to detect sound waves and convert it to electrical signals. The sound sensors may be arranged in the vehicle at various positions to reliably capture sound generated in a vehicle cabin.

Particularly, the sound sensors and/or the sound system may be configured to capture sound when the seat belt of the child seat is locked. Due to its mechanical engagement of a fastening connection of the seat belt such as buckle, clamp or the like, the seat belt may cause sound based on a material, a locking mechanism, a shape, etc. of the fastening connection of the seat belt. Additionally, the sound sensors and/or the sound system may be also configured to capture a mounting sound when the child seat is correctly mounted in the vehicle cabin.

Since the sound system continuously detects surrounding sound, it may be able to capture constantly any sound similar or identical to a lock sound of the seat belt. Accordingly, the control unit may be capable to monitor a locked or unlocked state of the seat belt in real time.

The control unit may be an electronic control unit (ECU). The control unit may be able to identify the sound captured by the sound system whether the sound corresponds to the safe locking sound of the seat belt. To verify the lock sound of the seat belt captured by the sound system, the control unit may have an access to the predetermined safe locking sound. The safe locking sound may be understood as the lock sound of the seat belt, particularly of the fastening connection, made when it is correctly engaged.

The safe locking sound may be set manually and/or determined automatically by the control unit based on lock sound data collected by the sound system during previous driving. Thus, the control unit may be capable to verify if the detected lock sound corresponds to the predetermined safe locking sound of the seat belt.

When the captured lock sound corresponds to the predetermined safe locking sound of the seat belt, the control unit may prompt the display unit to display the locked state of the seat belt of the child seat. The state of the seat belt may be shown in the display unit using a symbol and/or letters. Additionally, or alternatively, the sound system may also provide lock information of the seat belt.

In case the captured lock sound does not correspond to the predetermined safe locking sound of the seat belt, the control unit may be capable to indicate a wrong engagement of the seat belt graphically via the display unit and/or audibly via the sound system. Accordingly, the driver may receive information about the locked or unlocked state of the seat belt in real time without controlling the child seat during driving, which may increase safety of occupants in the vehicle.

In an example, the display unit is configured to receive a confirmation from a user if the seat belt is safely locked. Once the display unit shows that the seat belt of the child seat is locked, the user may be able to confirm the safe lock of the seat belt via the human machine interface unit. In case the user denies the confirmation of the safe lock, the control unit may be capable to classify the lock sound collected from the sound system as an unsafe or doubtful state of the seat belt of the child seat.

In an example, the display unit is further configured to display an activated state of the seat belt of the child seat. Once the control unit identifies the safely locked state and/or receives a confirmation of the safe lock of the seat belt from the user, the control unit may prompt the display unit to indicate the activated state of the seat belt of the child seat.

In an example, the control unit is further configured to identify if the lock sound corresponds to an unlocking sound of the seat belt and indicate in the display unit that the seat belt of the child seat is unlocked. The control unit may be able to distinguish between the safe locking sound and the unlocking sound detected by the sound sensor(s) of the sound system. Accordingly, the control unit may prompt the display unit to display that the seat belt of the child seat is unlocked.

In an example, the control unit is further configured to collect the lock sound of the seat belt of the child seat and determine a characteristic safe locking sound of the seat belt of the child seat based on the collected lock sound and the confirmation of the user, wherein the characteristic safe locking sound is the predetermined safe locking sound. The monitoring system may comprise a data storage medium or it may be at least coupled with the data storage medium. In addition, the control unit may be configured to transfer data from the sound system to the data storage medium to collect the lock sound. The user may be able to create a profile of an individual seat belt and/or child seat including its lock sound.

The control unit may be adapted to collect the lock sound in the data storage medium, which was confirmed by the user via the human machine interface unit. The control unit may be further configured to evaluate the lock sound collected in the data storage medium and identify a distinctive lock sound of the seat belt of each child seat arranged in the vehicle cabin. Accordingly, the control unit may be able to determine the characteristic safe locking sound of the respective seat belt.

The determined characteristic safe locking sound may be applied to verify if the lock sound currently detected by the sound system represents the safely locked state of the seat belt. Hence, if the currently detected lock sound is identical with the characteristic safe locking sound determined based on the collected lock sound of the respective seat belt, the safely locked state of the seat belt may be admitted.

In other words, the monitoring system may apply machine learning to determine the safe locking sound of the seat belt by continuously evaluating the collected lock sound, thus and steadily updating the safe locking sound for identifying the safely locked state of the seat belt. Accordingly, the child seat monitoring may be facilitated.

In an example, the monitoring system further comprises a sensor unit, and the sensor unit is configured to detect if the child seat is occupied. The sensor unit may comprise various sensor elements configured for monitoring if the child seat is in use, preferably before checking the seat belt state. The sensor unit may comprise, for instance, a pressure sensor element, an image sensor element, a radar sensor element, etc. Additionally, the sound system of the human machine interface unit may be also able to detect if the child seat is occupied.

Accordingly, the child seat monitoring may be only performed if the child seat is occupied by a child or a baby. In case two or more child seats are arranged in the vehicle cabin, the control unit may exclude unoccupied child seat(s)

for child seat monitoring. The display unit of the human machine interface unit may be configured to display which child seat(s) is occupied.

In an example, the control unit is further configured to generate a warning signal, if the seat belt is unlocked despite the activated state of the seat belt of the child seat. The warning signal may be a graphical signal, a light signal and/or a sound signal. The control unit may detect an inadvertent or accidental opening of the seat belt, particularly during driving, which may result in a dangerous situation.

As soon as the control unit identifies such a situation, the control unit may initiate to provide warning signal to the driver. The warning signal may be transmitted via the human machine interface unit. The display unit may be configured to receive an input from the user for deactivating the warning signal of the sound system after ensuring a safely locked state of the seat belt.

In an example, the control unit is configured to generate a warning signal, if no safe locking sound of the seat belt is detected, although the child seat is occupied. The control unit of the child seat monitoring system may be coupled with several subsystems of the vehicle. For instance, the control unit may receive information from a door monitoring system that a vehicle door is opened and closed again, which may mean that a passenger is present in the vehicle cabin. Additionally, the control unit may receive information from the sensor unit that at least one child seat is occupied. If, however, any safe locking sound of the seat belt is not detected by the sound system of the human machine interface unit, the control unit may initiate to provide the warning signal to the driver via the human machine interface unit to alert the driver about the unsafe or doubtful state of the seat belt of the child seat. Accordingly, a reliable child seat monitoring may be achieved.

In an example, the display unit is further configured to receive an input from the user for changing the state of the seat belt of the child seat displayed in the display unit. In case the control unit identified an erroneous state of the seat belt, which may be displayed on the display unit of the human machine interface unit, the user may be able to remedy the correct state of the seat belt manually.

For instance, if the display unit shows an activated state and/or a safely locked state of the seat belt although the seat belt is not actually secured, the user may be able to change to the deactivated state of the seat belt. Alternatively, the user may be able to change the state of the seat belt shown on the display unit as the activated state, which is not identified by the control unit, even though the seat belt is actually secured.

The control unit may be further configured to collect such erroneous behavior of the monitoring system and integrate it when estimating the characteristic safe locking sound of the seat belt.

In an example, the display unit is further configured to display a position of the child seat in the vehicle. The display unit may be able to show where the child seat is mounted in the vehicle. Such information may receive the display unit from the sensor unit and/or the control unit identifying an electrical connection of a car seat socket such as an Isofix interface, a top tether interface or the like. The user may be also able to confirm the position of the child seat displayed in the display unit. Together with the information of the activated state of the seat belt of the respective child seat, the driver may obtain reliable information of the child seat mounted in the vehicle without checking the child seat constantly.

In an example, the control unit is configured to determine each characteristic safe locking sound of each seat belt of two or more child seats based on the collected lock sound and the confirmation of the user provided by the user via the display unit. The monitoring system may be adapted to monitor several child seats simultaneously. The control unit may be able to distinguish the lock sound of the different child seats detected by the sound system and based on the information on the position of the child seat displayed on the display unit.

By receiving the confirmation and/or input from the user regarding the position and safely locked state of the child seat iteratively, the control unit may be able to determine the characteristic safe locking sound of the seat belt of each child seat accurately.

According to the present disclosure, a vehicle is presented. The vehicle comprises a monitoring system for a child seat and at least one child seat arrangeable in the vehicle. Accordingly, monitoring the child seat may be facilitated and child safety in the vehicle can be increased.

According to the present disclosure, a method for monitoring a child seat in a vehicle is presented. The method can comprise:
  capturing a lock sound of a seat belt of the child seat,
  identifying if the lock sound corresponds to a predetermined safe locking sound of the seat belt, and
  indicating in a display unit that the seat belt of the child seat is locked.

According to the present disclosure, a computer program element for monitoring a child seat in a vehicle is presented. The computer program element is adapted to perform the method steps as described above, when being executed by a processing element.

According to the present disclosure, one or more computer storage media may be presented. The computer storage media is encoded with instructions, that when executed by a computer, cause the computer to perform the operations of the respective method as described above.

The storage media may comprise internal to a computing device, such as a computer's SSD, or a removable device such as an external HDD or universal serial bus (USB) flash drive. There are also other types of storage media, including magnetic tape, compact discs (CDs) and non-volatile memory (NVM) cards.

It is noted that the above examples may be combined with each other irrespective of the aspect involved. Accordingly, the method may be combined with structural features and, likewise, the system may be combined with features described above with regard to the method.

FIG. 1 shows a vehicle 100 comprising a monitoring system 10 and at least one child seat arranged in the vehicle 100. The monitoring system 10 is configured for monitoring the child seat 20, particularly a safely locked state of a seat belt 21 of the child seat 20.

The monitoring system 10 comprises a human machine interface unit 30 and a control unit 40. The human machine interface unit 30 utilizes one or more user-friendly applications to facilitate communication between a user and the control unit 40 of the vehicle 100. The human machine interface unit 30 comprises at least a sound system 32 and a display unit 31. The display unit 31 of the human machine interface unit 30 is arranged in a driver's visual field. The monitoring system 10 further comprises a sensor unit 50 configured to detect if the child seat 20 is occupied.

Due to its mechanical engagement of a fastening connection of the seat belt 21 such as buckle, clamp or the like, the seat belt 21 may cause sound based on a material, a locking mechanism, a shape, etc. of the fastening connection of the seat belt 21. Thus, the sound system 32 comprises several sound sensors arranged at several positions inside the vehicle 100 for capturing a lock sound of a seat belt 21 of the child seat 20.

Figure 2:
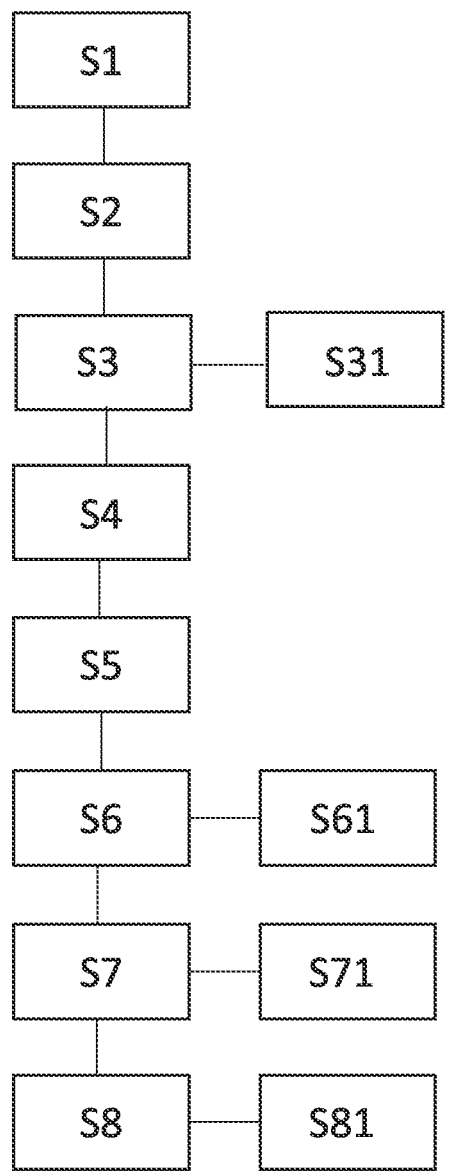
FIG. 2 shows schematically and exemplarily an example of a monitoring method for a child seat according to the present disclosure.

As shown in FIG. 2, the child seat monitoring system 10 is configured to perform the following steps, but not necessarily in this order:

S1: displaying a position of the child seat 20 in the vehicle 100 in the display unit 31;

S2: capturing a lock sound of the seat belt 21 of the child seat 20;

S3: identifying if the lock sound corresponds to a predetermined safe locking sound of the seat belt 21 to indicate in the display unit 31 that the seat belt 21 of the child seat 20 is locked;

S31: identifying if the lock sound corresponds to an unlocking sound of the seat belt 21 and indicating in the display unit 31 that the seat belt 21 of the child seat 20 is unlocked;

S4: indicating in the display unit 31 that the seat belt 21 of the child seat 20 is safely locked;

S5: receiving a confirmation from the user if the seat belt 21 is safely locked;

S6: collecting the lock sound of the seat belt 21 of the child seat 20 and determining a characteristic safe locking sound of the seat belt 21 of the child seat 20 based on the collected lock sound and the confirmation of the user, wherein the characteristic safe locking sound is the predetermined safe locking sound;

S61: determining each characteristic safe locking sound of each seat belt 21 of two or more child seats 20 based on the collected lock sound and the confirmation of the user provided by the user via the display unit 31;

S7: displaying an activated state of the seat belt 21 of the child seat 20;

S71: receiving an input from the user for changing the state of the seat belt 21 of the child seat 20 displayed in the display unit 31;

S8: generating a warning signal, if the seat belt 21 is unlocked despite the activated state of the seat belt 21 of the child seat 20;

S81: generating a warning signal, if unsafe locking sound of the seat belt 21 is detected, although the child seat 20 is occupied.

It has to be noted that examples of the disclosure are described with reference to different subject matters. In particular, some examples are described with reference to method type claims whereas other examples are described with reference to the device type claims. However, a person skilled in the art will gather from the above and the following description that, unless otherwise notified, in addition to any combination of features belonging to one type of subject matter also any combination between features relating to different subject matters is considered to be disclosed with this application. However, all features can be combined providing synergetic effects that are more than the simple summation of the features.

While the disclosure has been illustrated and described in detail in the drawings and description, such illustration and description are to be considered illustrative or exemplary and not restrictive. The disclosure is not limited to the disclosed examples. Other variations to the disclosed examples can be understood and effected by those skilled in the art in practicing a claimed disclosure, from a study of the drawings, the disclosure, and the dependent claims.

In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. Any reference signs in the claims should not be construed as limiting the scope.

What is claimed is:

1. A monitoring system for a child seat in a vehicle, comprising:
    a human machine interface unit comprising a sound sensor and a display unit; and
    a control unit configured to:
    capture, via the sound sensor, a sound associated with a seat belt of the child seat,
    determine whether the sound corresponds to a predetermined safe locking sound of the seat belt, and
    in response to determining that the sound corresponds to the predetermined safe locking sound of the seat belt, indicate, via the display unit, that the seat belt of the child seat is in a locked state.

2. The monitoring system of claim 1, wherein the control unit is further configured to receive, via the human machine interface unit, a confirmation from a user indicating whether the seat belt is safely locked.

3. The monitoring system of claim 2, wherein the control unit is further configured to receive, via the human machine interface unit, an input from the user for changing a state of the seat belt of the child seat displayed via the display unit.

4. The monitoring system of claim 2, wherein the control unit is further configured to determine a characteristic safe locking sound of the seat belt of the child seat based on the captured sound and the confirmation from the user indicating that the seat belt is in the locked state, and wherein the characteristic safe locking sound is the predetermined safe locking sound.

5. The monitoring system of claim 1, wherein the control unit is further configured to determine each characteristic safe locking sound of each seat belt of two or more child seats of the vehicle based on respective captured sounds associated with each seat belt and respective confirmations of one or more users indicating that the associated seat belt is in the locked state.

6. The monitoring system of claim 1, wherein the control unit is further configured to display, via the display unit, an activated state of the seat belt of the child seat.

7. The monitoring system of claim 6, wherein the control unit is further configured to generate a warning signal in response to a determination that the seat belt being in an unlocked state despite the activated state of the seat belt of the child seat.

8. The monitoring system of claim 1, wherein the control unit is further configured to:
    identify whether the sound corresponds to a predetermined unlocking sound of the seat belt, and
    indicate, via the display unit, that the seat belt of the child seat is in an unlocked state.

9. The monitoring system of claim 1, further comprising:
    a sensor unit configured to detect whether the child seat is occupied.

10. The monitoring system of claim 1, wherein the control unit is further configured to generate a warning signal in response to a determination that the predetermined safe locking sound of the seat belt is not detected, although the child seat is occupied.

11. The monitoring system of claim 1, wherein the control unit is further configured to display, via the display unit, a position of the child seat in the vehicle.

12. A vehicle comprising
a sound sensor;
a display unit;
a child seat arrangeable in the vehicle;
a processor; and
a memory that stores executable instructions that, when executed by the processor, facilitate performance of operations, comprising:
capturing, via the sound sensor, a sound associated with a seat belt of the child seat;
determining whether the sound corresponds to a predetermined safe locking sound of the seat belt; and
in response to determining that the sound corresponds to the predetermined safe locking sound of the seat belt, indicating, via the display unit, that the seat belt of the child seat is in a locked state.

13. The vehicle of claim 12, wherein the operations further comprise:
receiving, via an input device of the vehicle, a confirmation from a user indicating whether the seat belt is safely locked.

14. The vehicle of claim 13, wherein the operations further comprise:
determining a characteristic safe locking sound of the seat belt of the child seat based on the captured sound and the confirmation of the user indicating that the seat belt is in the locked state, wherein the characteristic safe locking sound is the predetermined safe locking sound.

15. The vehicle of claim 12, wherein the operations further comprise:
determining each characteristic safe locking sound of each seat belt of two or more child seats of the vehicle based on respective captured sounds associated with each seat belt and respective confirmations of one or more users indicating that the associated seat belt is in the locked state.

16. The vehicle of claim 12, wherein the operations further comprise:
identifying whether the sound corresponds to a predetermined unlocking sound of the seat belt, and
indicating, via the display unit, that the seat belt of the child seat is in an unlocked state.

17. A method for monitoring for a child seat in a vehicle, comprising:
capturing, by a system comprising a processor, via a sound sensor, a sound associated with a seat belt of the child seat;
determining, by the system, whether the sound corresponds to a predetermined safe locking sound of the seat belt; and
in response to determining that the sound corresponds to the predetermined safe locking sound of the seat belt, indicating, by the system, via a display unit, that the seat belt of the child seat is in a locked state.

18. The method of claim 17, further comprising:
generating, by the system, a warning signal in response to a determination that the seat belt being in an unlocked state despite an activated state of the seat belt of the child seat.

19. The method of claim 17, further comprising:
receiving, by the system, an input from a user for changing a state of the seat belt of the child seat displayed via the display unit.

20. The method of claim 17, further comprising:
displaying, by the system, via the display unit, a position of the child seat in the vehicle.

* * * * *